(12) United States Patent
Lin

(10) Patent No.: US 12,086,277 B2
(45) Date of Patent: Sep. 10, 2024

(54) BLOOM FILTER WHITELIST AND BLACKLIST OPERATIONS

(71) Applicant: PAYPAL, INC., San Jose, CA (US)

(72) Inventor: Ying Lin, Shanghai (CN)

(73) Assignee: PAYPAL, INC., San Jose, CA (US)

( * ) Notice: Subject to any disclaimer, the term of this patent is extended or adjusted under 35 U.S.C. 154(b) by 541 days.

(21) Appl. No.: 16/236,984

(22) PCT Filed: Dec. 25, 2018

(86) PCT No.: PCT/CN2018/123381
§ 371 (c)(1),
(2) Date: Jun. 21, 2021

(87) PCT Pub. No.: WO2020/132854
PCT Pub. Date: Jul. 2, 2020

(65) Prior Publication Data
US 2021/0319127 A1 Oct. 14, 2021

(51) Int. Cl.
G06F 21/62 (2013.01)

(52) U.S. Cl.
CPC ................... G06F 21/6218 (2013.01)

(58) Field of Classification Search
CPC ..... G06F 21/6218; G06F 21/44; G06F 21/554
See application file for complete search history.

(56) References Cited

U.S. PATENT DOCUMENTS

| 10,037,517 | B1* | 7/2018 | Chi | G06Q 20/4016 |
| 10,366,378 | B1* | 7/2019 | Han | G06Q 20/204 |
| 11,347,808 | B1* | 5/2022 | Plenderleith | G06F 16/2455 |
| 2015/0052005 | A1 | 2/2015 | Howe | |
| 2017/0206022 | A1* | 7/2017 | Theinert | G06F 3/0649 |

FOREIGN PATENT DOCUMENTS

| CN | 108369542 A | 8/2018 |
| WO | 2017053806 A1 | 3/2017 |
| WO | 2017075238 A1 | 5/2017 |

OTHER PUBLICATIONS

International Appl. No. PCT/CN2018/123381, International Search Report and Written Opinion mailed Sep. 26, 2019, 9 pages.

* cited by examiner

Primary Examiner — Trong H Nguyen
(74) Attorney, Agent, or Firm — HAYNES AND BOONE, LLP

(57) ABSTRACT

Computer system security can be improved through the use of whitelists and blacklists based on Bloom filters in the context of real-time data and electronic actions. A transaction may use a specific asset. A first search of the specific asset can be conducted in a Bloom filter whitelist comprising first assets classified as having a first status. The first search may return a plurality of first binary results corresponding to different hash functions performed the first assets. A second search of the specific asset can be conducted in a Bloom filter blacklist comprising second assets classified as having a second status different from the first status. The second search can return a plurality of second binary results corresponding to different hash function performed on the second assets, and the specific asset can be determined to be good or bad based on values of the first and second binary results.

20 Claims, 6 Drawing Sheets

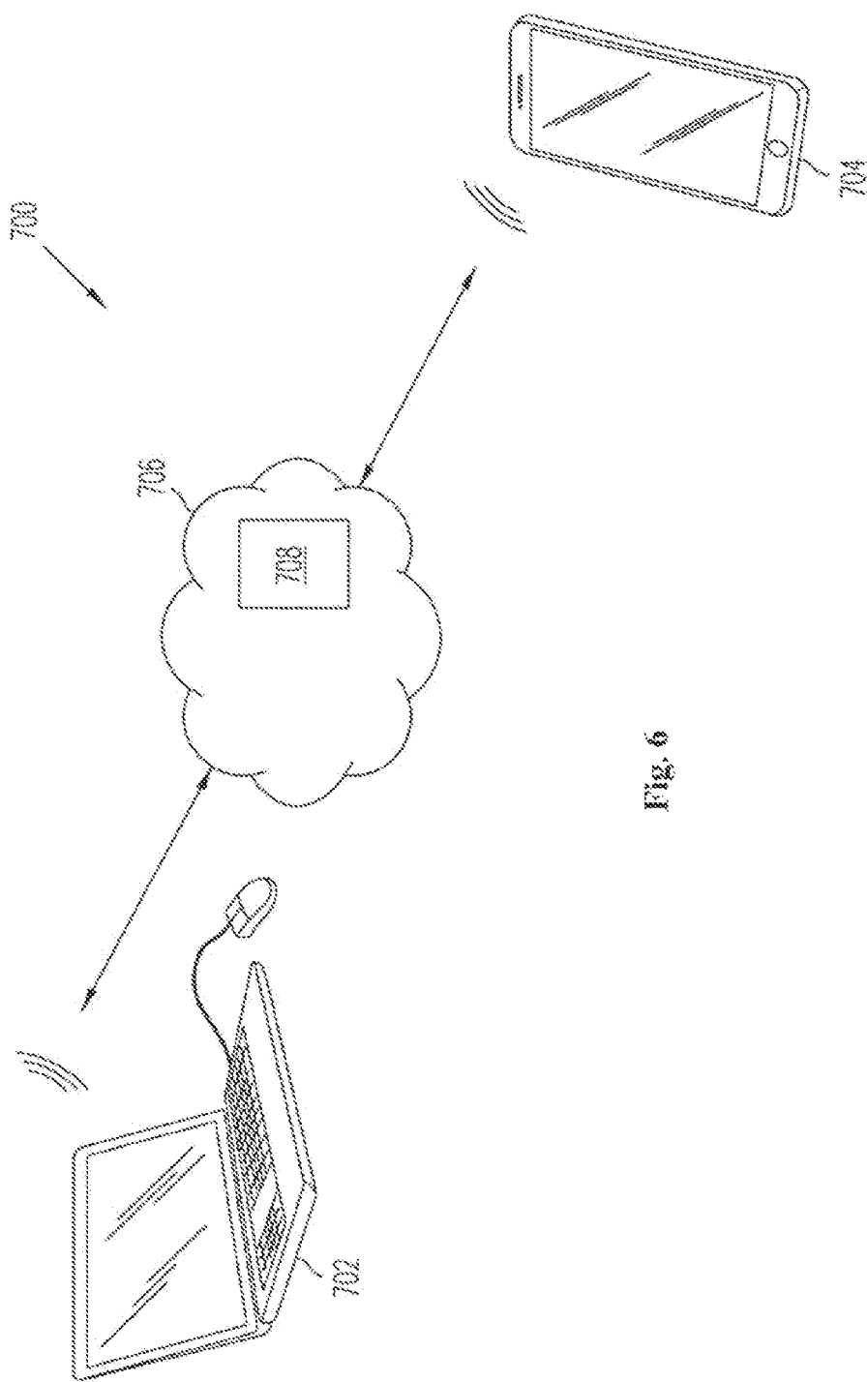

BLOOM FILTER WHITELIST AND BLACKLIST OPERATIONS

BACKGROUND

Technical Field

The present disclosure generally relates to computerized searching, and more particularly, to quickly and efficiently identifying an informational classification relating to a real-time transaction, particularly in contexts with large amounts of classifiable assets.

RELATED ART

Computer system operational security may rely on being able to identify when a malicious actor is attempting to perform an unauthorized action. In some instances, an identifiable asset may be involved in a particular action being attempted by a user. If this identifiable asset is known to have been involved in previous unauthorized and/or undesirable actions, then the particular attempted user action can be terminated.

Thus, when bad assets (e.g., an IP address associated with security issues/previous hacking attempts) are used to conduct computer operations, the negative ramifications may impact operational security and efficiency for the entities involved in the operations. Therefore, Applicant recognizes it is important to quickly identify which assets are likely to be good or bad, so that good assets may be allowed to continue the computer operations, while the bad assets may be denied the computer operations. However, conventional systems and methods are deficient in being able to quickly determine whether an asset is good or bad, even in view of existing information regarding other good or bad assets. This may be especially true when a "whitelist" cannot be efficiently used due to large numbers of assets (e.g. billions of IP addresses, for example).

BRIEF DESCRIPTION OF THE DRAWINGS

FIG. 6 is a simplified example of a cloud-based computing architecture according to various aspects of the present disclosure.

DETAILED DESCRIPTION

Figure 1:
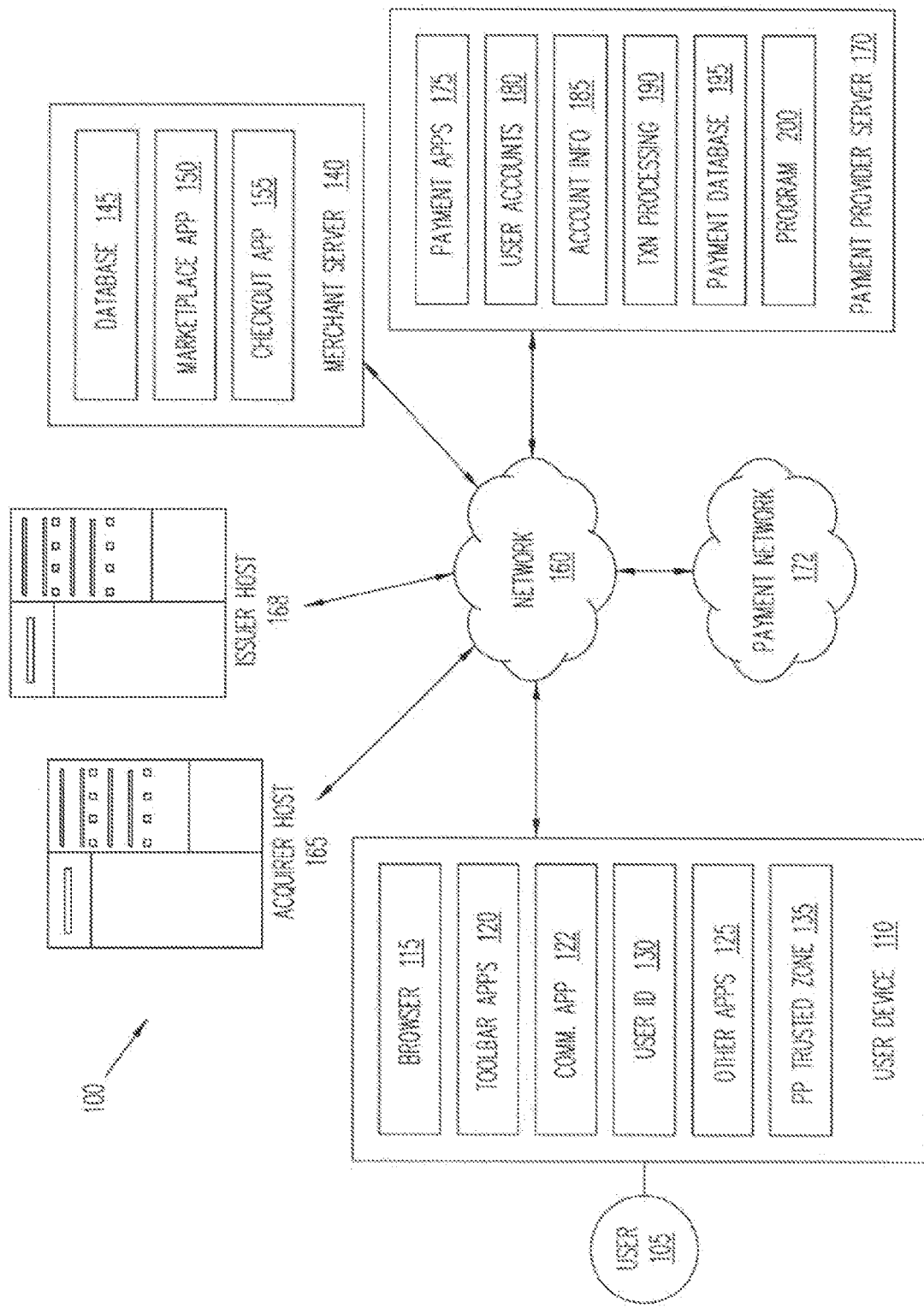
FIG. 1 is a simplified block diagram of a networked system according to various aspects of the present disclosure.

It is to be understood that the following disclosure provides many different embodiments for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

As computing and communication technologies continue to advance, electronic activities become increasingly prevalent. Assets such as Internet Protocol (IP) addresses, emails, phone numbers, device identifiers, or payment instruments are used to engage in online transactions and/or other computer operations. In some instances it may be desirable to have a whitelist of assets containing a list of recognized, approved, legitimate, or otherwise believed to be trustworthy assets (also known as good assets), while a blacklist of assets may contain a list of unrecognized, unapproved, illegitimate, or otherwise confirmed to be untrustworthy assets (also known as bad assets).

In other words, assets on a whitelist are believed to be good (e.g. based on past previous usage where a user IP address, email address, credit card number, etc., is associated with a number of, but assets on the blacklist are believed to be bad (e.g. based on previous usage where a user IP address was involved in a fraudulent transaction, or hacking attempt to takeover a user account, for example). When an online platform receives a request to determine a status of a specific asset involved in a computer operation (e.g., a transaction to purchase goods or services or to access or modify the contents of an electronic database), an online platform may search a whitelist or blacklist to determine whether the specific asset is a good asset or a bad asset.

However, as electronic activities become more prevalent, the size of such a whitelist or blacklist may grow rapidly, often to the point where they may be too cumbersome to search through in practice. As a non-limiting example, suppose a payment provider has 100 million good accounts, where each account has 30 associated assets. Each asset may require at least 30 bytes of storage, and therefore the electronic storage of a whitelist containing these accounts will take up 90 gigabytes of electronic storage space. Such a big size for the whitelist is not only costly in terms of space, but it can be quite time consuming to search through such an extensive list for good assets. In a production environment, the payment provider may not have the luxury to take an unduly long amount of time to search through the whitelist (or blacklist), as that will be deemed too slow and intolerable. These are unique problems that arise specifically in a computer technology context and require an improvement in computer technology to solve. An online payment platform, for example, may have to make a decision in a few hundred milliseconds as to whether to approve an electronic payment transaction—and searching a massive whitelist containing hundreds of millions or even billions of assets can take prohibitively long, and therefore be impracticable.

The present disclosure overcomes the problem discussed above by implementing a whitelist and/or a blacklist of assets using Bloom filters, which provides particular advantages to other approaches to implementing such a whitelist and/or blacklist over large datasets. The following operations are described relative to various embodiments: First, a list containing good assets and a list containing bad assets are created from known good accounts and known bad accounts. The assets can include email addresses, IP addresses, device identifiers, bank accounts, phone numbers, etc. Next, a two-bit (or binary) vector (e.g., containing 0s and 1s) is created as a Bloom filter whitelist, while another two-bit (binary) vector is created as a Bloom filter blacklist. The Bloom filter whitelist and Bloom filter blacklist are initialized with 0s. For each asset in the Bloom filter whitelist or Bloom filter blacklist, a hashing operation is performed. For example, a K number of different hash functions $h_1$ through $h_k$ may be applied for each asset to generate a plurality of hash numbers. The bits in the Bloom filter whitelist at the index of the good assets are set to 1. The bits in the Bloom filter blacklist at the index of the bad assets are also set to 1. The Bloom filter whitelist and Bloom filter blacklist are then deployed in a production environment and are updated periodically. Thereafter, when a request to verify the status of an asset is received—for example in association with an online transaction—the asset is hashed with the hash functions $h_1$ through $h_k$ to obtain a k number of hashes for the asset, which are then looked up in the Bloom filter whitelist and Bloom filter blacklist. Based on the match results with the Bloom filter whitelist and Bloom filter blacklist, the asset (or the account associated with the asset) can be determined to be good or bad.

Such a Bloom filter whitelist or Bloom filter blacklist can provide useful information to quickly and efficiently identify whether a new account has any connections with established good accounts (or bad accounts), which can greatly reduce false negative (or false positive) cases. For example, if an account has an asset hit (e.g., a match) in the Bloom filter whitelist but did not have a hit in the Bloom filter blacklist, the account is extremely likely to be a good account according to various embodiments. If the asset hits both the Bloom filter whitelist and the Bloom filter blacklist, or hits the Bloom filter blacklist only, the account is more likely to be bad. If the asset hits neither the Bloom filter whitelist nor the Bloom filter blacklist, then either the account may be too new, or the payment provider (or other entity) may lack sufficient amount of information to determine whether this account is good or bad. Compared to other implementations whitelists and blacklists, the Bloom filter whitelist and Bloom filter blacklist discussed herein is space efficient, as its required storage space is may be only 10%-20% of more naively implemented lists in various embodiments, and also importantly, lookup times are reduced. As such, the present disclosure improves upon existing computer technology by saving computer storage space and allowing for faster lookups which can be critical in time-sensitive tasks such as electronic payment transaction approval. Thus, searching can be performed significantly faster using the Bloom filter whitelist and Bloom filter blacklist discussed herein, compared to whitelists and blacklists. The faster search speed is another improvement upon existing computer technology. Furthermore, the use of the Bloom filter blacklist in addition to the Bloom filter whitelist can greatly reduce false positives, and as such the present disclosure can prevent the losses that would have been incurred due to the false positives. False negatives can also be reduced, which reduces friction for a user and reduces the need for additional information or data to process a valid request or transaction. The various aspects of the present disclosure will be discussed below in more detail with reference to FIGS. 1-6.

FIG. 1 is a block diagram of a networked system suitable for conducting electronic online transactions according to an embodiment. Networked system 100 may comprise or implement a plurality of servers and/or software components that operate to perform various payment transactions or processes. Exemplary servers may include, for example, stand-alone and enterprise-class servers operating a server OS such as a MICROSOFT™ OS, a UNIX™ OS, a LINUX™ OS, or another suitable server-based OS. It can be appreciated that the servers illustrated in FIG. 1 may be deployed in other ways and that the operations performed, and/or the services provided by such servers may be combined or separated for a given implementation and may be performed by a greater number or fewer number of servers. One or more servers may be operated and/or maintained by the same or different entities.

The system 100 may include a user device 110, a merchant server 140, a payment provider server 170, an acquirer host 165, an issuer host 168, and a payment network 172 that are in communication with one another over a network 160. Payment provider server 170 may be maintained by a payment service provider, such as PAYPAL™, Inc. of San Jose, CA A user 105, such as a consumer, may utilize user device 110 to perform an electronic transaction using payment provider server 170. For example, user 105 may utilize user device 110 to visit a merchant's web site provided by merchant server 140 or the merchant's brick-and-mortar store to browse for products offered by the merchant. Further, user 105 may utilize user device 110 to initiate a payment transaction, receive a transaction approval request, or reply to the request. Note that a transaction, as used herein, refers to any suitable action performed using the user device, including payments, transfer of information, display of information, etc. Although only one merchant server is shown, a plurality of merchant servers may be utilized if the user is purchasing products from multiple merchants.

User device 110, merchant server 140, payment provider server 170, acquirer host 165, issuer host 168, and payment network 172 may each include one or more electronic processors, electronic memories, and other appropriate electronic components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, the user device may be implemented as a personal computer (PC), a smart phone, a smart phone with additional hardware such as NFC chips, BLE hardware etc., wearable devices with similar hardware configurations such as a gaming device, a Virtual Reality Headset, or that talk to a smart phone with unique hardware configurations and running appropriate software, laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for online shopping and/or merchant sites for viewing and purchasing goods and/or services.

Still referring to FIG. 1, the user device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 also may include other applications to perform functions, such as email, texting, voice and IM applications that allow user 105 to send and receive emails, calls, and texts through network 160, as well as applications that enable the user to communicate, transfer information, make payments, and otherwise utilize a digital wallet through the payment provider as discussed herein.

User device 110 may include one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100.

In conjunction with user identifiers 130, user device 110 may also include a trusted zone 135 owned or provisioned by the payment service provider with agreement from a device manufacturer. The trusted zone 135 may also be part of a telecommunications provider SIM that is used to store appropriate software by the payment service provider capable of generating secure industry standard payment credentials as a proxy to user payment credentials based on user 105's credentials/status in the payment providers system/age/risk level and other similar parameters.

User device 110 may install and execute a payment application received from the payment service provider to facilitate payment processes. The payment application may allow a user to send payment transaction requests to the payment service provider, which includes communication of data or information needed to complete the request, such as funding source information.

Still referring to FIG. 1, merchant server 140 may be maintained, for example, by a merchant or seller offering various products and/or services. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes charities as well as retailers and restaurants. For example, a purchase transaction may be payment or gift to an individual. Merchant server 140 may include a database 145 identifying available products and/or services (e.g., collectively referred to as items) which may be made available for viewing and purchase by user 105. Accordingly, merchant server 140 also may include a marketplace application 150 which may be configured to serve information over network 360 to browser 115 of user device 110. In one embodiment, user 105 may interact with marketplace application 150 through browser applications over network 160 in order to view various products, food items, or services identified in database 145.

Merchant server 140 also may include a checkout application 155 which may be configured to facilitate the purchase by user 105 of goods or services online or at a physical POS or store front. Checkout application 155 may be configured to accept payment information from or on behalf of user 105 through payment provider server 170 over network 160. For example, checkout application 155 may receive and process a payment confirmation from payment provider server 170, as well as transmit transaction information to the payment provider and receive information from the payment provider (e.g., a transaction ID). Checkout application 155 may be configured to receive payment via a plurality of payment methods including cash, credit cards, debit cards, checks, money orders, or the like.

Payment provider server 170 may be maintained, for example, by an online payment service provider which may provide payment between user 105 and the operator of merchant server 140. In this regard, payment provider server 170 may include one or more payment applications 175 which may be configured to interact with user device 110 and/or merchant server 140 over network 160 to facilitate the purchase of goods or services, communicate/display information, and send payments by user 105 of user device 110.

Payment provider server 170 also maintains a plurality of user accounts 180, each of which may include account information 185 associated with consumers, merchants, and funding sources, such as credit card companies. For example, account information 185 may include private financial information of users of devices such as account numbers, passwords, device identifiers, usernames, phone numbers, credit card information, bank information, or other financial information which may be used to facilitate online transactions by user 105. Advantageously, payment application 175 may be configured to interact with merchant server 140 on behalf of user 105 during a transaction with checkout application 155 to track and manage purchases made by users and which and when funding sources are used.

A transaction processing application 190, which may be part of payment application 175 or separate, may be configured to receive information from a user device and/or merchant server 140 for processing and storage in a payment database 195. Transaction processing application 190 may include one or more applications to process information from user 105 for processing an order and payment using various selected funding instruments, as described herein. As such, transaction processing application 190 may store details of an order from individual users, including funding source used, credit options available, etc. Payment application 175 may be further configured to determine the existence of and to manage accounts for user 105, as well as create new accounts if necessary. In some embodiments, the Bloom filter whitelist and Bloom filter blacklist may be stored on the database 195.

According to various aspects of the present disclosure, the payment provider server 170 may also include a program 200. The program 200 is configured to generate the Bloom filter whitelist and the Bloom filter blacklist, maintain or update the Bloom filter whitelist and Bloom filter blacklist, and/or search through the Bloom filter whitelist and Bloom filter blacklist to determine whether an asset or an account is good or bad according to embodiments of the present disclosure. Note that a variety of operations and aspects are described herein with respect to a payment provider and/or to computer systems of a payment provider—however, the present techniques are not limited to such entities and systems, and can be executed by any computer system as long as the requisite data access is present.

It is understood that although the embodiment of FIG. 1 illustrates the program 200 as residing on the payment provider server 170, this is not intended to be limiting. In some embodiments, the program 200 (or a similar tool) may be implemented on a computer of the acquirer host 165 or on a computer the issuer host 168 as well. In other embodiments, the program 200 may be divided in parts, with some parts being implemented on the payment provider server 170, while other parts are implemented on the merchant server 140 and/or the acquirer host 165 or issuer host 168. Furthermore, although the program 200 is illustrated as being separate from the transaction processing application 190 in the embodiment shown in FIG. 1, the transaction processing application 190 may implement some, or all, of the functionalities of the program 200 in other embodiments. In other words, the program 200 may be integrated within the transaction processing application 190 in some embodiments. The features and functionalities of the program 200 will be discussed later in more detail with reference to FIGS. 2-6.

Still referring to FIG. 1, the payment network 172 may be operated by payment card service providers or card associations, such as DISCOVER™, VISA™, MASTERCARD™, AMERICAN EXPRESS™, RUPAY™, CHINA UNION PAY™, etc. The payment card service providers may provide services, standards, rules, and/or policies for issuing various payment cards. A network of communication devices, servers, and the like also may be established to relay payment related information among the different parties of a payment transaction.

Acquirer host 165 may be a server operated by an acquiring bank. An acquiring bank is a financial institution that accepts payments on behalf of merchants. For example, a merchant may establish an account at an acquiring bank to receive payments made via various payment cards. When a user presents a payment card as payment to the merchant, the merchant may submit the transaction to the acquiring bank. The acquiring bank may verify the payment card number, the transaction type and the amount with the issuing bank and reserve that amount of the user's credit limit for the merchant. An authorization will generate an approval code, which the merchant stores with the transaction.

Issuer host 168 may be a server operated by an issuing bank or issuing organization of payment cards. The issuing banks may enter into agreements with various merchants to accept payments made using the payment cards. The issuing bank may issue a payment card to a user after a card account has been established by the user at the issuing bank. The user then may use the payment card to make payments at or with various merchants who agreed to accept the payment card.

Figure 2:
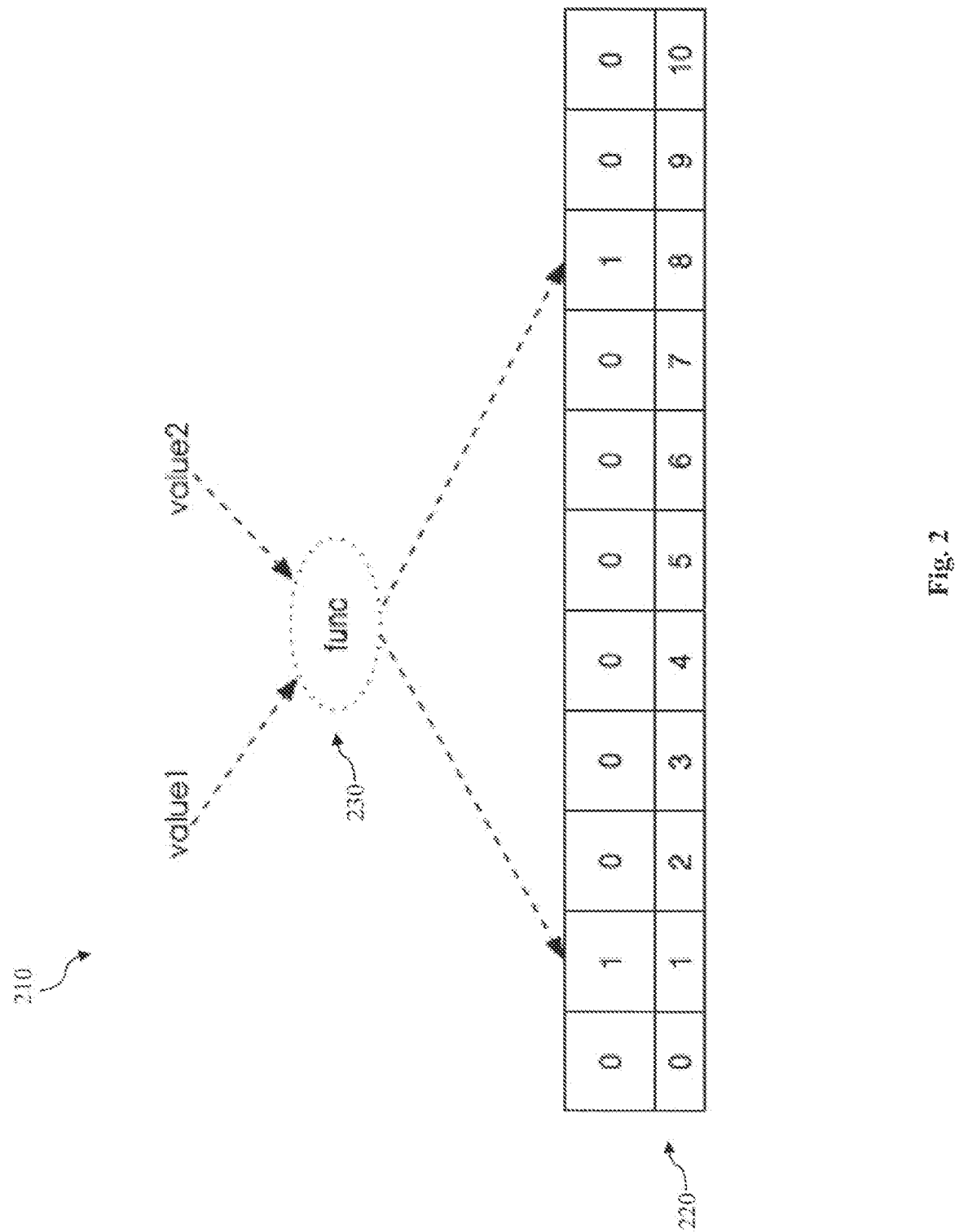
FIG. 2 illustrates a hash map according to various aspects of the present disclosure.

FIG. 2 is a block diagram illustrating the operation of a hash map 210 as a simple example of hashing. In more detail, a binary vector 220 is created first. The binary vector 220 includes a plurality of bits, each of which can store a binary value of either 0 or 1. Each of the binary values also has a corresponding index, for example the indexes 0-10 as shown in FIG. 2. In a computer operation context, the indexes may correspond to addresses in Random Access Memory (RAM) in an embodiment where the binary vector is stored in RAM (or cache memory), or the indexes may correspond to addresses in a hard drive or other type of electronic memory (e.g., FLASH) where the binary vector is stored in more "permanent" storage.

All the binary bits in the binary vector 220 are initialized with a value of 0. Thereafter, a hash function 230 is used to map a plurality of different values—such as value1 and value2—to different bits of the binary vector 220. The hash function 230 may employ a predefined algorithm to assign each of the plurality of values to a respective bit of the binary vector 220. In the example shown in FIG. 2, the value1 is mapped to the binary bit corresponding to the index 1, and the value2 is mapped to the binary bit corresponding to the index 8. The binary value of these bits are then set to 1. According to various aspects of the present disclosure, the value1 or value2 may represent the assets involved in a computer operation, such as an IP address, an email address, a phone number, a device identifier or a payment instrument, etc.

Figure 3:
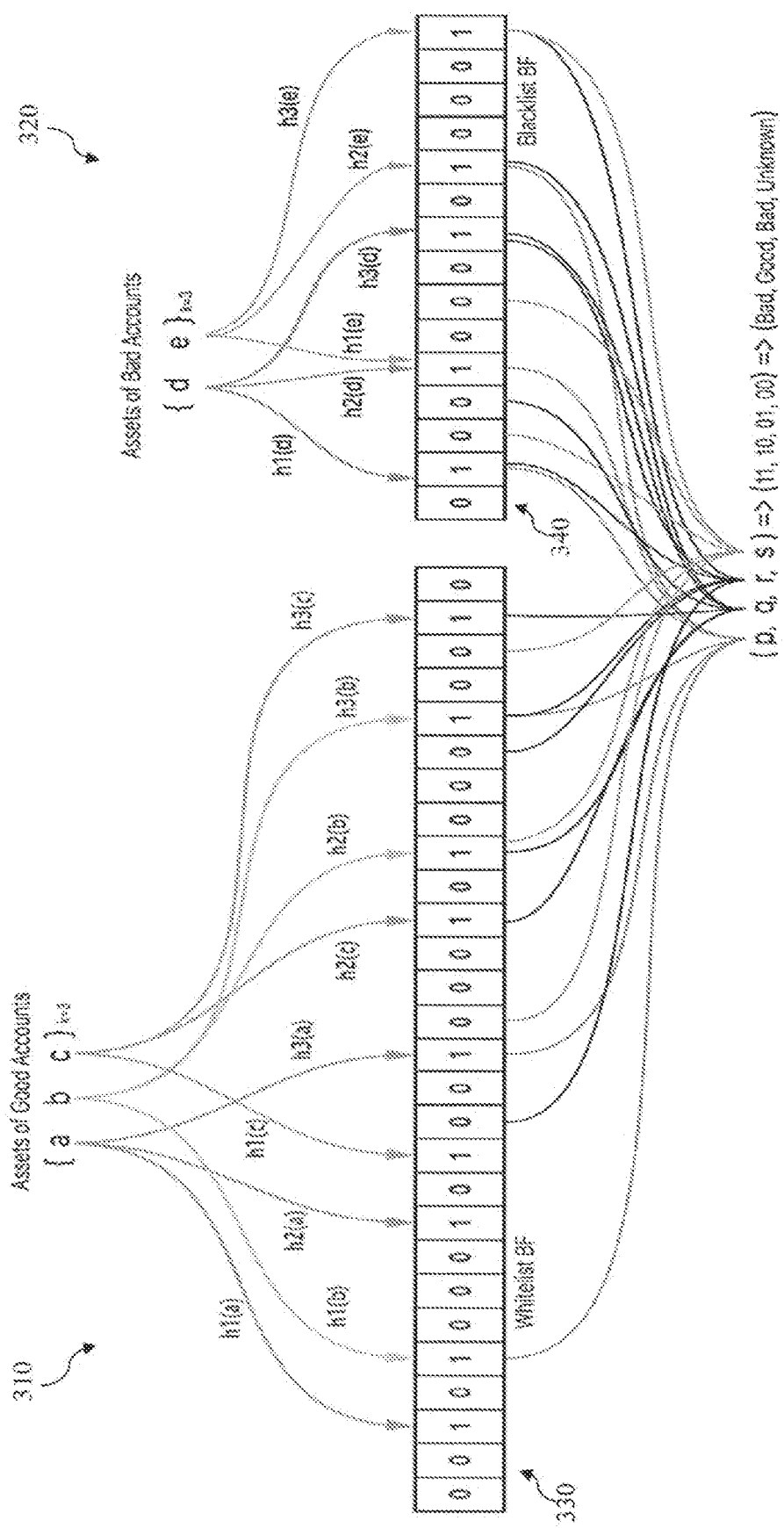
FIG. 3 illustrates a Bloom filter whitelist and a Bloom filter blacklist according to various aspects of the present disclosure.

FIG. 3 is a block diagram illustrating the generation and the use of a Bloom filter whitelist 310 and a Bloom filter blacklist 320 according to the embodiments of the present disclosure. The Bloom filter whitelist 310 and the Bloom filter blacklist 320 may be generated by the program 200 of FIG. 1. In more detail, the Bloom filter whitelist 310 includes a binary vector 330, and the Bloom filter blacklist 320 includes a binary vector 340. The binary vectors 330 and 340 may be similar to the binary vector 220 discussed above in FIG. 2 but may be much longer. Also, the indexes (or addresses) in each binary vector 330 or 340 are not shown in FIG. 3 for reasons of simplicity, but it is understood that each of the bits in the binary vectors 330 or 340 may have a corresponding index, which as discussed above may include addresses in computer memory. The bits in the binary vectors 330 and 340 are each initialized with a value 0, which means none of the bits have been taken yet.

The program 200 may gather information regarding previously verified good accounts or good assets and previously confirmed bad accounts or bad assets. In some embodiments, the good accounts or bad accounts may include user accounts for an online merchant or an online service provider. Each user account (whether good or bad) may include a plurality of assets, such as an IP address, an email address, a device identifier, a phone number, or a payment instrument such as a credit card or a checking account. A good asset or account may include assets or accounts that have been previously verified as trustworthy or safe, whereas a bad asset or account may include assets or accounts that have been previously confirmed as untrustworthy or unsafe, for example an IP address tied to malicious electronic attacks, or a payment instrument that has been confirmed as fraudulent, or an email address that is associated with a bot (rather than a real human user), etc. In FIG. 3, assets "a", "b", and "c" of the Bloom filter whitelist 310 may represent the known good assets associated with known good accounts, and assets "d" and "e" of the Bloom filter blacklist 320 may represent the known bad assets associated with known bad accounts.

As shown in FIG. 3, each of the good assets a, b, and c, is mapped to three different bits in the binary vector 330 via three hash functions h1, h2, and h3. For example, the asset a is mapped to the $3^{rd}$ bit in the vector 330 via the hash function h1($a$), to the $9^{th}$ bit in the vector 330 via the hash function h2($a$), and to the $14^{th}$ bit in the vector 330 via the has function h3($a$). As discussed above in association with FIG. 2, the hash functions may be predefined or have predetermined algorithms. One objective of the hash function design is that they should "spread out" or uniformly distribute the mapped bits throughout the vector 330 as much as possible, so as to avoid "collisions" between the mappings of different assets. For example, hash functions that use encryption algorithms such as the MD5 message-digest algorithm or the SHA (Secure Hash Algorithm) may be used. As a non-limiting example, a hash function of the present disclosure may be defined using the Python code below:

```
class SimpleHash( ):
    def __init__(self, cap, seed):
        self.cap = cap
        self.seed = seed
    def hash(self, value):
        ret = 0
        for i in range(len(value)):
            ret += self.seed*ret + ord(value[i])
        return (self.cap-1) & ret
SimpleHash(1024, 12345).hash('192.168.1.254')
```

Similarly, each of the other good assets b and c is mapped to three different bits in the binary vector 330 via the three hash functions h1, h2, and h3, and each of the bad assets d and e is mapped to three different bits in the binary vector 340 via the three hash functions h1, h2, and h3. For example, the bad asset d is mapped to the $2^{nd}$ bit in the vector 340 via the hash function h1(d), to the $5^{th}$ bit in the vector 340 via the hash function h2(d), and to the $9^{th}$ bit in the vector 340 via the has function h3(d). The values of the binary bits in the vectors 330 and 340 that are mapped to the assets a, b, c, d, and e are then set to 1, meaning that these bits are now taken or have corresponding assets.

Note that in the example shown in FIG. 3, the value for k (representing the number of hash functions) is equal to 3, though it is understood that k may have a different value such as 2 or 4 or another integer value in other embodiments. When the value of k increases, the Bloom filter whitelist and Bloom filter blacklist are implemented using a greater number of hash functions, which could enhance the accuracy of the searching performed later and better reduce false positives or negatives. However, the searching may also take more time to complete as the value of k increases. Conversely, as the value of k decreases, the Bloom filter whitelist and Bloom filter blacklist searching takes less time, but the accuracy is also lower. Here, a k value of 3 represents an acceptable tradeoff between searching speed and accuracy.

In any case, after the binary vectors 330 and 340 have been initialized and subsequently mapped by the known good and bad assets a-e, the searching through the vectors 330 and 340 may be performed quickly and efficiently. In more detail, suppose "p", "q", "r", and "s" represent assets whose status needs to be determined. For example, as a part of an online transaction to purchase goods or services, a user may supply a payment instrument p as an asset to an online merchant (e.g., the merchant server 140). The online merchant may then send a request to the payment provider server 170 to determine the status of the asset p, for example to determine whether the asset p is likely a good asset or a bad asset.

In response to this request, the program 200 may conduct a search of the asset p through the Bloom filter whitelist 310. For example, the hash functions h1, h2, and h3 discussed above may be applied to the asset p. The hash functions h1, h2, and h3 map the asset p to the $5^{th}$ bit, the $14^{th}$ bit, and the $24^{th}$ bit of the binary vector 330, respectively. The $5^{th}$ bit, the $14^{th}$ bit, and the $24^{th}$ bit of the binary vector 330 have the binary values 1, 1, and 1, and thus it may be said that the search of the asset p in the Bloom filter whitelist returns a binary value of 111. The program 200 may then conduct a search of the asset p through the Bloom filter blacklist 320. Again, the hash functions h1, h2, and h3 may be applied to the asset p, which map the asset p to the $2^{nd}$ bit, the $5^{th}$ bit, and the $11^{th}$ bit of the binary vector 340, respectively. The $2^{nd}$ bit, the $5^{th}$ bit, and the $11^{th}$ bit of the binary vector 340 also have the binary values 1, 1, and 1, and thus it may be said that the search of the asset p in the Bloom filter blacklist returns a binary value of 111. On the one hand, the return of the values 111 in the Bloom filter whitelist indicates that the asset p is likely a good asset. However, the return of the values 111 in the Bloom filter blacklist indicates that the asset p is likely a bad asset. According to the various aspects of the present disclosure, a "match" or a "hit" (e.g., returning all is) of the asset in both the Bloom filter whitelist and the Bloom filter blacklist means that the hit in the Bloom filter whitelist may be a false positive. As such, the asset p may still be considered a bad asset based on its "match" in the Bloom filter blacklist alone, regardless of its "match" in the Bloom filter whitelist. Since the asset p is a bad asset, the program 200 may report the bad asset status back to a requesting entity (e.g., an online merchant), and/or deny the transaction involving the asset p.

In the case of the asset q, the hash functions h1, h2, and h3 map the asset q to the $18^{th}$ bit, the $20^{th}$ bit, and the $27^{th}$ bit of the binary vector 330, respectively. The $18^{th}$ bit, the $20^{th}$ bit, and the $27^{th}$ bit of the binary vector 330 have the binary values 1, 1, and 1, and thus it may be said that the search of the asset q in the Bloom filter whitelist returns a binary value of 111. The program 200 may then conduct a search of the asset q through the Bloom filter blacklist 320, where the hash functions h1, h2, and h3 map the asset q to the $4^{th}$ bit, the $9^{th}$ bit, and the $11^{th}$ bit of the binary vector 340, respectively. The $4^{th}$ bit, the $9^{th}$ bit, and the $11^{th}$ bit of the binary vector 340 have the binary values 0, 1, and 1, and thus it may be said that the search of the asset q in the Bloom filter blacklist returns a binary value of 011. According to the present disclosure, the asset q is considered to have a "match" in a list only when all the hash functions return a 1. In this case, since the hash function h1 returns a value of 0 in the vector 340, the asset q is not considered to have a match in the Bloom filter blacklist, even though the other two hash functions h2 and h3 each return a value of 1. In other words, the asset q has a match in the Bloom filter whitelist but does not have a match in the Bloom filter blacklist. As such, the asset q is considered a good asset. The program 200 may then facilitate the transaction involving the asset q, for example by reporting back to a requesting entity that the status of the asset q is good, and/or by accepting the request to conduct a transaction involving the asset q.

The same processes discussed above are repeated for asset r, where the hash functions h1, h2, and h3 map the asset r to the $12^{th}$ bit, the $23^{rd}$ bit, and the $24^{th}$ bit of the binary vector 330, respectively. The $12^{th}$ bit, the $23^{rd}$ bit, and the $24^{th}$ bit of the binary vector 330 have the binary values 0, 0, and 1, and thus it may be said that the search of the asset r in the Bloom filter whitelist returns a binary value of 001, the program 200 may then conduct a search of the asset r through the Bloom filter blacklist 320, where the hash functions h1, h2, and h3 map the asset r to the $2^{nd}$ bit, the $9^{th}$ bit, and the $15^{th}$ bit of the binary vector 340, respectively. The $2^{nd}$ bit, the $9^{th}$ bit, and the $15^{th}$ bit of the binary vector 340 have the binary values 1, 1, and 1, and thus it may be said that the search of the asset r in the Bloom filter blacklist returns a binary value of 111. As such, the asset r does not have a match in the Bloom filter whitelist but does have a match in the Bloom filter blacklist, and thus the asset r is considered a bad asset. Again, the program 200 may deny the transaction involving the asset r in response to the determination that it is a bad asset.

Lastly, for the asset s, the hash functions h1, h2, and h3 map the asset s to the $15^{th}$ bit, the $20^{th}$ bit, and the $26^{th}$ bit of the binary vector 330, respectively. The $15^{th}$ bit, the $20^{th}$ bit, and the $26^{th}$ bit of the binary vector 330 have the binary values 0, 1, and 0, and thus it may be said that the search of the asset s in the Bloom filter whitelist returns a binary value of 010. The program 200 may then conduct a search of the asset s through the Bloom filter blacklist 320, where the hash functions h1, h2, and h3 map the asset s to the $3^{rd}$ bit, the $7^{th}$ bit, and the $15^{th}$ bit of the binary vector 340, respectively. The $3^{th}$ bit, the $7^{th}$ bit, and the $15^{th}$ bit of the binary vector 340 have the binary values 0, 0, and 1, and thus it may be said that the search of the asset s in the Bloom filter blacklist returns a binary value of 001. The asset s does not have a match in the Bloom filter whitelist or the Bloom filter blacklist, and thus the asset s is considered neither a good asset nor a bad asset. Rather, the asset s is considered an unknown asset. For example, there may be an insufficient amount of history or information to determine with certainty whether the asset s is a good asset or a bad asset. Further investigation or additional risk assessment may be needed to determine the status of the asset s. The program 200 may put the transaction involving the asset s on hold temporarily in response to the determination that the asset s is an unknown asset, for example at least until the additional investigation or risk assessment indicates that it is more likely to be a good asset or a bad asset.

In the above examples, the assets p, q, r, s may be different types of assets or may be the same type of assets. For example, in some embodiments, the asset p may be a payment instrument, the asset q may be an IP address, the asset r may be a device identifier, and the asset s may be an email address. The computer operations involving these assets p, q, r, s may vary too. For example, the computer operation may include an online purchase of a good or a service, or a request to access or modify the contents of an electronic database, or a request to establish an electronic communication with another entity, etc. Regardless of the type of asset and/or the type of computer operation, the present disclosure offers improvements in computer technology. One improvement is reduced electronic storage space, since storing the vectors 330 and 340 requires much less storage space than storing entire contents of another type of whitelist or a blacklist. Another improvement is improved searching speed, since searching through the Bloom filter whitelist and Bloom filter blacklist herein can be accomplished significantly faster than searching through much larger computer files corresponding to other types of whitelists and blacklists.

Figure 4:
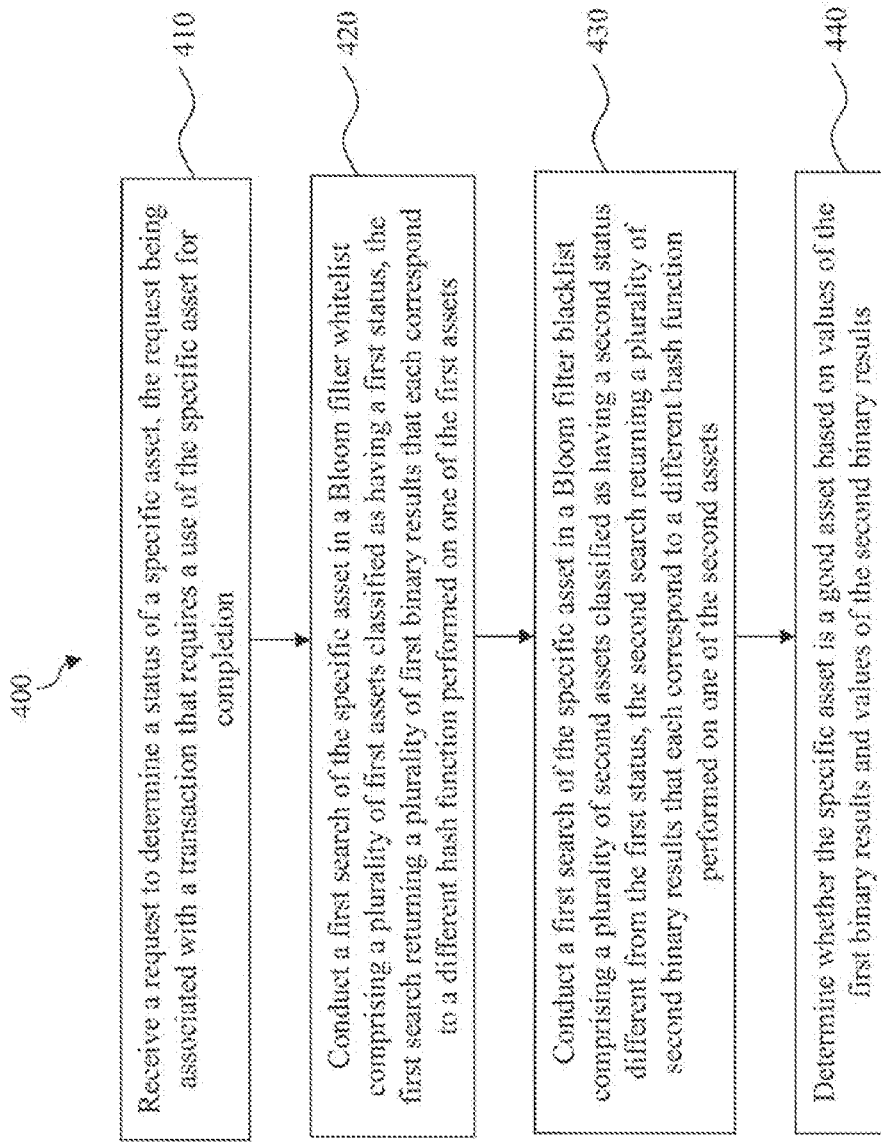
FIG. 4 is a flowchart illustrating a method according to various aspects of the present disclosure.

Referring now to FIG. 4, a flowchart of a method 400 is illustrated. The method 400 relates to space-efficient whitelist and/or blacklist usage. It is understood that at least one of the steps of the method 400 is performed using one or more hardware electronic processors.

The method 400 includes a step 410 to receive a request to determine a status of a specific asset. The request is associated with a transaction that requires a use of the specific asset for completion.

The method 400 includes a step 420 to conduct a first search of the specific asset in a Bloom filter whitelist comprising a plurality of first assets classified as having a first status. The first search returns a plurality of first binary results that each correspond to a different hash function performed on one of the first assets.

The method 400 includes a step 430 to conduct a first search of the specific asset in a Bloom filter blacklist comprising a plurality of second assets classified as having a second status different from the first status. The second search returns a plurality of second binary results that each correspond to a different hash function performed on one of the second assets.

The method 400 includes a step 440 to determine whether the asset is a good asset based on values of the first binary results and values of the second binary results.

In some embodiments, the method 400 further includes: a step of receiving reports from a plurality of first transactions that the first assets are verified good assets, a step of generating the Bloom filter whitelist based on the first assets, a step of receiving reports from a plurality of second transactions that the second assets are verified bad assets, and a step of generating the Bloom filter blacklist based on the second assets. These steps may be performed before the step 410 is performed.

In some embodiments, the method 400 further includes a step of, before the receiving the request, selecting the set of predefined hash functions. The Bloom filter whitelist and the Bloom filter blacklist are each generated using the set of predefined hash functions. In some embodiments, the generating the Bloom filter whitelist comprises using the predefined hash functions to generate a first binary vector as the Bloom filter whitelist, and the generating the Bloom filter blacklist comprises using the predefined hash functions to generate a second binary vector as the Bloom filter blacklist. In some embodiments, the selecting the set of predefined hash functions comprises selecting hash functions that: map each of the first assets to multiple bits of the first binary vector in a substantially uniform distribution; or map each of the second assets to multiple bits of the second binary vector in a substantially uniform distribution. In some embodiments, the generating the first binary vector comprises: initializing each bit of the first binary vector with a 0; and setting a subset of the bits of the first binary vector with a 1 based on a hash function mapping with the verified good assets. In some embodiments, the generating the second binary vector comprises: initializing each bit of the second binary vector with a 0; and setting a subset of the bits of the second binary vector with a 1 based on a hash function mapping with the verified bad assets.

In some embodiments, the determining whether the asset is a good asset comprises: determining that the asset is a good asset in response to the plurality of first binary results containing all 1s and the plurality of second binary results containing at least one 0. In some embodiments, the method 400 may further include a step of facilitating the transaction in response to the determining that the asset is a good asset.

In some embodiments, the determining whether the asset is a good asset comprises: determining that the asset is a bad asset in response to the plurality of second binary results containing all 1s. In some embodiments, the method 400 may further include a step of denying the transaction in response to the determining that the asset is a bad asset.

In some embodiments, the determining whether the asset is a good asset comprises: determining that the asset is an unknown asset in response to the plurality of first binary results containing at least one 0 and the plurality of second binary results containing at least one 0. In some embodiments, the method 400 may further include a step of conducting a risk assessment of the asset in response to the determining that the asset is an unknown asset.

In some embodiments, the transaction comprises a transaction to purchase a good or a service or a request to modify one or more resources of an electronic database. In some embodiments, the asset comprises an Internet Protocol (IP) address, a device identifier, an email address, a phone number, or a payment instrument.

It is understood that additional method steps may be performed before, during, or after the steps 410-440 discussed above. However, these additional steps are not discussed in detail herein for reasons of simplicity.

Based on the above discussions, it can be seen that the present disclosure offers advantages over other types of whitelist and blacklist generation and searching. It is understood, however, that not all advantages are necessarily discussed in detail herein, different embodiments may offer different advantages, and that no particular advantage is required for all embodiments. One advantage is that the present disclosure can store whitelists and blacklists more efficiently than other schemes. For example, by implementing the Bloom filter whitelist and Bloom filter blacklist, the electronic storage spacer required to store the whitelist and blacklist of assets only requires about 10%-20% of electronic storage space needed to store other whitelists and blacklists. This is at least in part due to the fact that the storage of the Bloom filter whitelist and Bloom filter blacklist herein does not need to store the full amount of information associated with each good or bad asset and/or each good or bad account. Rather, binary vectors (storing 1s and 0s) corresponding to the whitelist and blacklist occupy much less electronic storage space than other whitelists and blacklists having a full amount of information stored therein. Another advantage is that the present disclosure allows for much faster searching to be performed. Rather than searching through an extensive whitelist or blacklist that contains a full amount of information regarding good or bad assets, the searching herein is performed using much smaller whitelists and blacklists, which can return results at a much faster speed. Yet another advantage is the accuracy of the results and the reduction of false positives. For example, by mapping the good assets and bad assets to multiple bits of the binary vector using multiple hash functions, the search result accuracy is improved, and the implementation of the Bloom filter blacklist reduces the false positives that could have occurred if only the Bloom filter whitelist was used. Based on the above, the present disclosure can quickly and efficiently identify bad assets involved in a computer operation, and thus it can reduce or mitigate the losses when bad assets are otherwise allowed to engage in computer operations.

The present disclosure thus implements a solution to a problem that specifically arises in a computer networking context (e.g., the reduction in electronic storage space and faster searching through electronic files). The server 170 with the program 200 implemented thereon is an improvement over existing computer technologies. Other advantages may include compatibility with existing systems and low cost of implementation.

Figure 5:
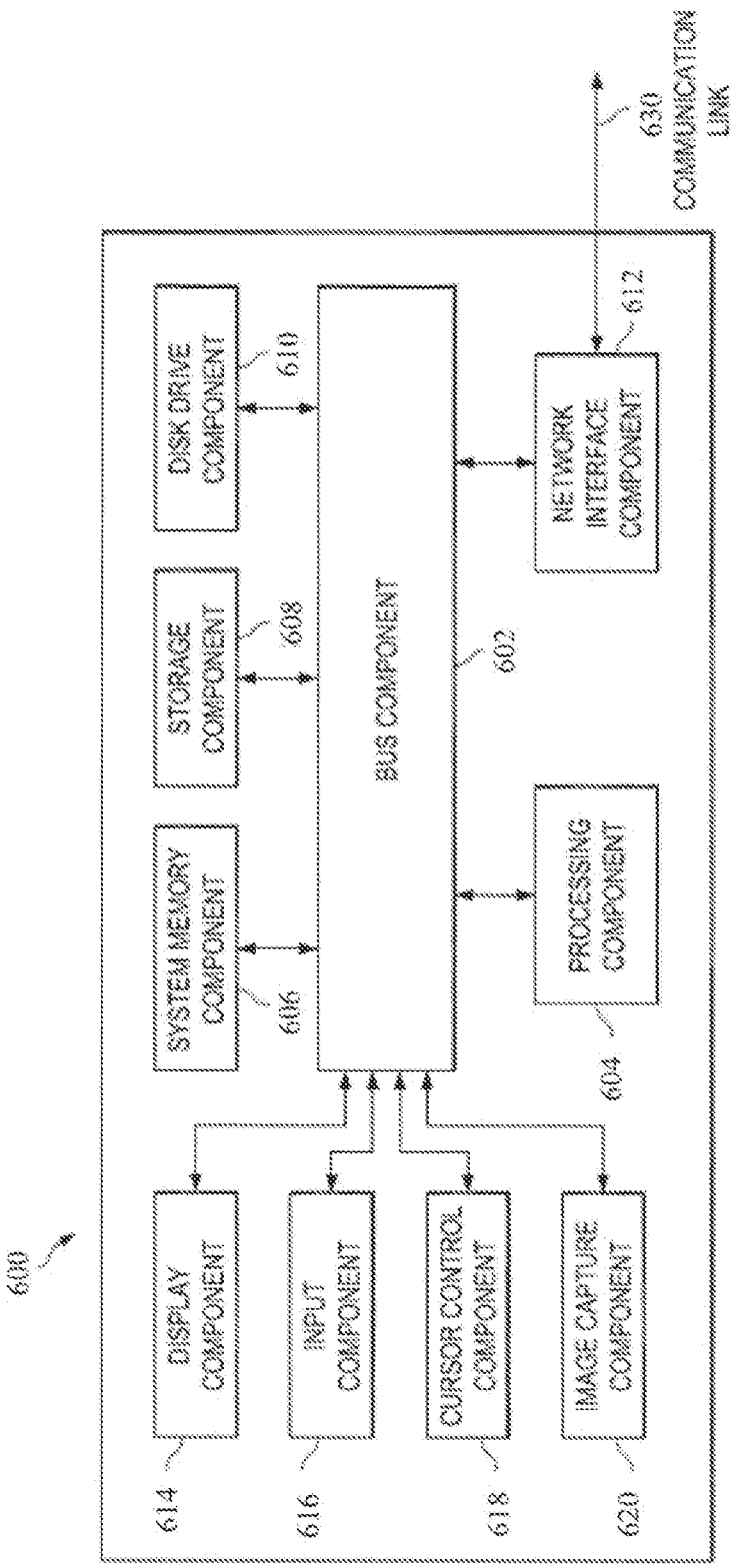
FIG. 5 is an example computer system for implementing the various steps of the methods of FIG. 4 according to various aspects of the present disclosure.

FIG. 5 is a block diagram of a computer system 600 suitable for implementing various methods and devices described herein, for example, the various method steps of the method 400. In various implementations, the devices capable of performing the steps may comprise a network communications device (e.g., mobile cellular phone, laptop, personal computer, tablet, etc.), a network computing device (e.g., a network server, a computer processor, an electronic communications interface, etc.), or another suitable device. Accordingly, it should be appreciated that the devices capable of implementing the method 400 may be implemented as the computer system 600 in a manner as follows.

In accordance with various embodiments of the present disclosure, the computer system 600, such as a network server or a mobile communications device, includes a bus component 602 or other communication mechanisms for communicating information, which interconnects subsystems and components, such as a computer processing component 604 (e.g., processor, micro-controller, digital signal processor (DSP), etc.), system memory component 606 (e.g., RAM), static storage component 608 (e.g., ROM), disk drive component 610 (e.g., magnetic or optical), network interface component 612 (e.g., modem or Ethernet card), display component 614 (e.g., cathode ray tube (CRT) or liquid crystal display (LCD)), input component 616 (e.g., keyboard), cursor control component 618 (e.g., mouse or trackball), and image capture component 620 (e.g., analog or digital camera). In one implementation, disk drive component 610 may comprise a database having one or more disk drive components.

In accordance with embodiments of the present disclosure, computer system 600 performs specific operations by the processor 604 executing one or more sequences of one or more instructions contained in system memory component 606. Such instructions may be read into system memory component 606 from another computer readable medium, such as static storage component 608 or disk drive component 610. In other embodiments, hard-wired circuitry may be used in place of (or in combination with) software instructions to implement the present disclosure.

Logic may be encoded in a computer readable medium, which may refer to any medium that participates in providing instructions to the processor 604 for execution. Such a medium may take many forms, including but not limited to, non-volatile media and volatile media. In one embodiment, the computer readable medium is non-transitory. In various implementations, non-volatile media includes optical or magnetic disks, such as disk drive component 610, and volatile media includes dynamic memory, such as system memory component 606. In one aspect, data and information related to execution instructions may be transmitted to computer system 600 via a transmission media, such as in the form of acoustic or light waves, including those generated during radio wave and infrared data communications. In various implementations, transmission media may include coaxial cables, copper wire, and fiber optics, including wires that comprise bus 602.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 630 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 600 may transmit and receive messages, data, information and instructions, including one or more programs (i.e., application code) through communication link 630 and communication interface 612. Received program code may be executed by computer processor 604 as received and/or stored in disk drive component 610 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

FIG. 6 illustrates an example cloud-based computing architecture 700, which may also be used to implement various aspects of the present disclosure. The cloud-based computing architecture 700 includes a mobile device 704 and a computer 702, both connected to a computer network 706 (e.g., the Internet or an intranet). In one example, a consumer has the mobile device 704, which is configured to run software with functionalities described above with reference to FIGS. 1-5.

The mobile device 704 is in communication with cloud-based resources 708, which may include one or more computers, such as server computers, with adequate memory resources to handle requests from a variety of users. A given embodiment may divide up the functionality between the mobile device 704 and the cloud-based resources 708 in any appropriate manner. For example, an app on mobile device 704 may perform basic input/output interactions with the user, but a majority of the processing may be performed by the cloud-based resources 708. As another example, the mobile device 704 and the cloud-based resources 708 may work together to execute the steps of the method 400 discussed above. However, other divisions of responsibility are also possible in various embodiments.

The cloud-based computing architecture 700 also includes the personal computer 702 in communication with the cloud-based resources 708. In one example, a participating merchant or consumer/user may access information from the cloud-based resources 708 by logging on to a merchant account or a user account at computer 702.

It is understood that the various components of cloud-based computing architecture 700 are shown as examples only. For instance, a given user may access the cloud-based resources 708 by a number of devices, not all of the devices being mobile devices. Similarly, a merchant or another user may access resources 708 from any number of suitable mobile or non-mobile devices. Furthermore, the cloud-based resources 708 may accommodate many merchants and users in various embodiments.

It should be appreciated that like reference numerals are used to identify like elements illustrated in one or more of the figures, wherein these labeled figures are for purposes of illustrating embodiments of the present disclosure and not for purposes of limiting the same.

One aspect of the present disclosure involves a method relating to space-efficient whitelist usage. The method includes: receiving a request to determine a status of a specific asset, the request being associated with a transaction that requires a use of the specific asset for completion; conducting a first search of the specific asset in a Bloom filter whitelist comprising a plurality of first assets classified as having a first status, the first search returning a plurality of first binary results that each correspond to a different hash function performed on one of the first assets, wherein each different hash function belongs to a set of predefined hash functions; conducting a second search of the specific asset in a Bloom filter blacklist comprising a plurality of second assets classified as having a second status different from the first status, the second search returning a plurality of second binary results that each correspond to a different hash function performed on one of the second assets, wherein each different hash function belongs to the set of predefined hash functions; and determining whether the specific asset is a good asset based on values of the first binary results and values of the second binary results.

One aspect of the present disclosure involves a system. The system includes a non-transitory memory and one or more hardware processors coupled to the non-transitory memory and configured to read instructions from the non-transitory memory to cause the system to perform operations comprising: receiving, from an entity, a request to engage in a computer operation that involves a particular asset that includes an Internet Protocol (IP) address, a device identifier, an email address, a phone number, or a payment instrument; mapping, via a plurality of predefined hash functions, the particular asset to a Bloom filter whitelist, wherein the Bloom filter whitelist includes a plurality of components that have been mapped by the plurality of predefined hash functions to a plurality of first assets that have been previously verified as being trustworthy or safe; obtaining a first result based on mapping the particular asset to the Bloom filter whitelist; mapping, via the plurality of predefined hash functions, the particular asset to a Bloom filter blacklist, wherein the Bloom filter blacklist includes a plurality of components that have been mapped by the plurality of predefined hash functions to a plurality of second assets that have been previously confirmed as being untrustworthy or unsafe; obtaining a second result based on mapping the particular asset to the Bloom filter blacklist; and determining whether the request should be granted based on the first result and the second result.

Yet another aspect of the present disclosure involves a non-transitory machine-readable medium having stored thereon machine-readable instructions executable to cause a machine to perform operations comprising: generating a Bloom filter whitelist by mapping, via a plurality of predefined hash functions, a plurality of first assets having a first status to a plurality of bits of a first binary vector; generating a Bloom filter blacklist by mapping, via the plurality of predefined hash functions, a plurality of second assets having a second status to a plurality of bits of a second binary vector; receiving a request to determine a status of a third asset, the request being associated with a computer operation that requires a use of the third asset for completion; obtaining a first search result by searching the third asset in the Bloom filter whitelist, the first search result including a plurality of first binary values; obtaining a second search result by searching the third asset in the Bloom filter blacklist, the second search result including a plurality of second binary values; and determining the status of the third asset based on the first search result and the second search result.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method relating to whitelist usage, comprising:
generating a Bloom filter whitelist at least in part by:
mapping, via a first hash function, each asset of a plurality of first assets to a different first bit of a first binary vector, wherein each of the first assets is classified as having a first status; and
mapping, via a second hash function different from the first hash function, each asset of the plurality of first assets to a different second bit of the first binary vector, wherein each of the different second bits is different from each of the different first bits;
receiving a request to determine a status of a specific asset, the request being associated with a transaction that requires a use of the specific asset for completion;
conducting a first search of the specific asset in the Bloom filter whitelist at least in part by mapping the specific asset to a third bit of the first binary vector via the first hash function and by mapping the specific asset to a fourth bit of the first binary vector via the second hash function; the first search returning a plurality of first binary results
conducting a second search of the specific asset in a Bloom filter blacklist comprising a plurality of second assets classified as having a second status different from the first status, the second search returning a plurality of second binary results that each correspond to the first hash function or the second hash function performed on one of the second assets; and
determining whether the specific asset is a first type of asset based on values of the first binary results and values of the second binary results.

2. The method of claim 1, further comprising,
generating the Bloom filter blacklist at least in part by:
mapping, via the first hash function, each asset of the plurality of second assets to a different first bit of a second binary vector; and
mapping, via the second hash function, each asset of the plurality of second assets to a different second bit of the second binary vector, wherein each of the different second bits of the second binary vector is different from each of the different first bits of the second binary vector.

3. The method of claim 2, wherein the second search is conducted at least in part by mapping the specific asset to a third bit of the second binary vector via the first hash function and by mapping the specific asset to a fourth bit of the second binary vector via the second hash function.

4. The method of claim 2, wherein generating the second binary vector comprises:
initializing each bit of the second binary vector with a 0; and
setting the different first bits and the different second bits of the second binary vector with a 1 based on the mapping via the first hash function and the second hash function as a part of the generating the Bloom filter blacklist.

5. The method of claim 1, wherein the first hash function and the second hash function have different hashing algorithms.

6. The method of claim 1, wherein:
the mapping via the first hash function is performed such that the different first bits are separated from one another by other bits of the first binary vector; or
the mapping via the second hash function is performed such that the different second bits are separated from one another by other bits of the first binary vector.

7. The method of claim 1, wherein generating the first binary vector comprises:
initializing each bit of the first binary vector with a 0; and
setting the different first bits and the different second bits of the first binary vector with a 1 based on the mapping via the first hash function and the mapping via the second hash function as a part of the generating the Bloom filter whitelist.

8. The method of claim 1, wherein the determining whether the specific asset is a first type of asset comprises: determining that the specific asset is a first type of asset in response to the plurality of first binary results containing all 1s and the plurality of second binary results containing at least one 0.

9. The method of claim 8, further comprising: facilitating the transaction in response to the determining that the specific asset is a first type of asset.

10. The method of claim 1, wherein the determining whether the specific asset is a first type of asset comprises: determining that the specific asset is a second type of asset in response to the plurality of second binary results containing all 1s.

11. The method of claim 10, further comprising: denying the transaction in response to the determining that the specific asset is a second type of asset.

12. The method of claim 1, wherein the determining whether the specific asset is a first type of asset comprises: determining that the specific asset is an unknown asset in response to the plurality of first binary results containing at least one 0 and the plurality of second binary results containing at least one 0.

13. The method of claim 12, further comprising: conducting a risk assessment of the specific asset in response to the determining that the specific asset is an unknown asset.

14. The method of claim 1, wherein:
the transaction comprises a transaction to purchase a good or a service or a request to modify one or more resources of an electronic database; and
the specific asset comprises an Internet Protocol (IP) address, a device identifier, an email address, or a phone number.

15. A system, comprising:
a non-transitory memory; and
one or more hardware processors coupled to the non-transitory memory and configured to read instructions from the non-transitory memory to cause the system to perform operations comprising:

receiving, from an entity, a request to engage in a computer operation that involves a particular asset that includes an Internet Protocol (IP) address, a device identifier, an email address, a phone number, or a payment instrument;

generating a Bloom filter whitelist at least in part by, mapping, via at least a first hash function and a second hash function different from the first hash function, each asset of a plurality of first assets to a different first bit and to a different second bit of a first binary vector, respectively, wherein each of the first assets has been previously confirmed as being trustworthy or safe;

mapping, at least in part via the first hash function and the second hash function, the particular asset to the Bloom filter whitelist;

obtaining a first result based on the mapping the particular asset to the Bloom filter whitelist;

mapping, at least in part via the first hash function and the second hash function, the particular asset to a Bloom filter blacklist, wherein the Bloom filter blacklist includes a plurality of components that have been mapped by at least the first hash function and the second hash function to a plurality of second assets that have been previously confirmed as being untrustworthy or unsafe;

obtaining a second result based on the mapping the particular asset to the Bloom filter blacklist; and determining whether the request should be granted based on the first result and the second result.

16. The system of claim 15, wherein the operations further comprise:

determining, based on a transaction, whether a further asset used in the transaction belongs to the plurality of first assets or to the plurality of second assets;

updating, in response to a determination that the further asset belongs to the plurality of first assets, the Bloom filter whitelist by mapping the further asset to a subset of components of the Bloom filter whitelist at least in part via the first hash function and the second hash function; or updating, in response to a determination that the further asset belongs to the plurality of second assets, the Bloom filter blacklist by mapping the further asset to a subset of the components of the Bloom filter blacklist at least in part via the first hash function and the second hash function.

17. The system of claim 15, wherein the operations further comprise, before the receiving the request: configuring the first hash function or the second hash function based on one or more parameters that include collision avoidance or distribution uniformity.

18. The system of claim 15, wherein:

the first binary vector contains a plurality of first components that each have a value of a 0 or a 1, wherein the first components that have the value of 1 are mapped to the plurality of first assets by at least the first hash function and the second hash function; and the Bloom filter blacklist includes a second binary vector containing a plurality of second components that each have a value of a 0 or a 1, wherein the second components that have the value of 1 are mapped to the plurality of second assets by at least the first hash function and the second hash function.

19. The system of claim 18, wherein the determining comprises:

determining that the request should be granted in response to the first result including all 1s and the second result including at least one 0;

determining that the request should be denied in response to the second result including all 1s; or determining that the request should be evaluated further in response to the first result including at least one 0 and the second result including at least one 0.

20. A non-transitory machine-readable medium having stored thereon machine-readable instructions executable to cause a machine to perform operations comprising:

generating a Bloom filter whitelist by mapping, via a plurality of predefined hash functions that include a first hash function and a second hash function different from the first hash function, a plurality of first assets having a first status to a plurality of bits of a first binary vector, wherein at least one of the first assets is mapped to a first bit of the first binary vector via the first hash function and mapped to a second bit of the first binary vector via the second hash function;

generating a Bloom filter blacklist by mapping, via the plurality of predefined hash functions that include the first hash function and the second hash function, a plurality of second assets having a second status to a plurality of bits of a second binary vector, wherein at least one of the second assets is mapped to a first bit of the second binary vector via the first hash function and mapped to a second bit of the second binary vector via the second hash function;

receiving a request to determine a status of a third asset, the request being associated with a computer operation that requires a use of the third asset for completion;

obtaining a first search result by searching the third asset in the Bloom filter whitelist at least in part by mapping the third asset to a third bit of the first binary vector via the first hash function and by mapping the third asset to a fourth bit of the first binary vector via the second hash function, the first search result including a plurality of first binary values;

obtaining a second search result by searching the third asset in the Bloom filter blacklist at least in part by mapping the third asset to a third bit of the second binary vector via the first hash function and by mapping the third asset to a fourth bit of the second binary vector via the second hash function, the second search result including a plurality of second binary values; and determining the status of the third asset based on the first search result and the second search result.

* * * * *